UNITED STATES PATENT OFFICE.

WILLIAM CORFIELD, OF CHICAGO, ILLINOIS.

IMPROVEMENT IN DISTILLING TOGETHER SPIRITS OF TURPENTINE AND ALCOHOLIC LIQUIDS.

Specification forming part of Letters Patent No. 136,137, dated February 25, 1873.

*To all whom it may concern:*

Be it known that I, WILLIAM CORFIELD, of Chicago, in the county of Cook and State of Illinois, have invented a new and useful Improvement in Distilling Hydrated Spirits of Turpentine and Camphene, of which the following is a specification:

The nature of the present invention consists in making hydrated spirits of turpentine and camphene by mixing the turpentine with the mash during and previous to the completion of the fermenting process, and then distilling the product by a continuous distillation; the hydrated spirits of turpentine to be used as a solvent for gums, and the camphene for the purposes for which it is now used. After grain or other fermentable substance is placed in the fermenting-tub and yeast added, I add one gallon of spirits of turpentine to each bushel of grain in the mash. After fermentation is completed the compound is distilled by a continuous distilling apparatus patented by me December 29, 1868, or by an apparatus that will produce a like result. The results of such distillation will be hydrated spirits of turpentine and camphene. The hydrated spirits of turpentine, being lighter than the camphene, permits the latter to be drawn off by a suitable faucet, thus separating the two articles. In order to get the greatest amount of alcohol from the mash the spirits of turpentine should be added to the fermenting substance in small quantities; as, for instance, put in one pint at a time per bushel of grain until the gallon of turpentine is all in, care being taken to put all the turpentine in before fermentation ceases.

I am aware that spirits of turpentine have been added to the mash after fermentation has fully taken place, and that the product has been distilled, producing a milky liquid which, when redistilled, produced a burning-fluid; but in such case there was but the one product after the labor of redistilling, whereas by adding the spirits of turpentine during fermentation the full product of the entire mixture is secured without waste; while at the same time experiment proves that the fermenting process has a very decided effect in producing a chemical union of the products, which is not attained in any other process of manufacture.

The novelty, therefore, of the invention consists more in combining the turpentine during the fermenting process than in the distilling, although the latter process is necessary to complete the result.

Having thus described my invention, I disclaim turpentine distilled with fermented grain, such being described and claimed in my patent No. 54,061, and dated April 17, 1866; but

What I claim, and desire to secure by Letters Patent, is—

The combination of grain or other similar substance in a fermenting state with spirits of turpentine, to form a chemical union, and then distilling the mixture by a continuous distillation to produce hydrated spirits of turpentine and camphene by one and the same process, as specified.

WILLIAM CORFIELD.

Witnesses:
G. L. CHAPIN,
JAS. BARKEY.